US006176434B1

(12) United States Patent
Baldur

(10) Patent No.: US 6,176,434 B1
(45) Date of Patent: Jan. 23, 2001

(54) METHOD AND STRUCTURE FOR IDENTIFYING SOLID OBJECTS HAVING A DYNAMIC SURFACE

(75) Inventor: Roman Baldur, Waterloo (CA)

(73) Assignee: Forensic Technology Wai Inc., Montreal (CA)

( * ) Notice: Under 35 U.S.C. 154(b), the term of this patent shall be extended for 0 days.

(21) Appl. No.: 09/061,326

(22) Filed: Apr. 17, 1998

(51) Int. Cl.[7] .............................. G06K 19/06; B41M 3/14

(52) U.S. Cl. .............................................. 235/494; 427/7

(58) Field of Search .............................. 235/494, 462.01, 235/487; 427/7, 447, 448, 443, 454, 455, 458

(56) References Cited

U.S. PATENT DOCUMENTS

| | | | |
|---|---|---|---|
| 883,778 | 4/1908 | Boyle . | |
| 1,157,380 | 10/1915 | Gray . | |
| 1,251,491 | 1/1918 | Ferriss . | |
| 1,336,745 | 4/1920 | Irwin et al. . | |
| 1,467,961 | 9/1923 | Tibbetts . | |
| 4,035,942 | 7/1977 | Wiczer . | |
| 4,175,346 * | 11/1979 | Zemsky | 42/76 R |
| 4,720,907 | 1/1988 | Rapp . | |
| 5,632,108 | 5/1997 | Ruger et al. . | |
| 5,759,613 * | 6/1998 | Howse et al. | 427/7 |

* cited by examiner

*Primary Examiner*—Thien M. Le
(74) *Attorney, Agent, or Firm*—Swabey Ogilvy Renault

(57) ABSTRACT

The identification structure of the present invention provides a plurality of minute holes arranged in a code on a precision machine contact surface of the object to be identified. The holes are of such a small diameter and sufficiently deep depth that they do not interfere with or detract from the function of the object identified, but any attempt to remove them by grinding or otherwise, degrades or destroys the proper functioning of the object identified. The holes can be formed into a binary code which in one aspect depends on each hole being in one of two alternative positions. In another possible arrangement, the binary code can depend on the presence or absence of a hole in a particular position and a check sum can be included to prevent tampering or alteration. Electrical discharge machining provides an excellent fabrication technique. Placing the identification structure on the inside of the barrel of a gun is one example of an application. The ideal location for the holes, of the identification structure, being generally along the groove in the rifling adjacent to the railing edge of a land area in the barrel of the gun. An appropriate fiber optic device can be used to read the code in such a location.

65 Claims, 4 Drawing Sheets

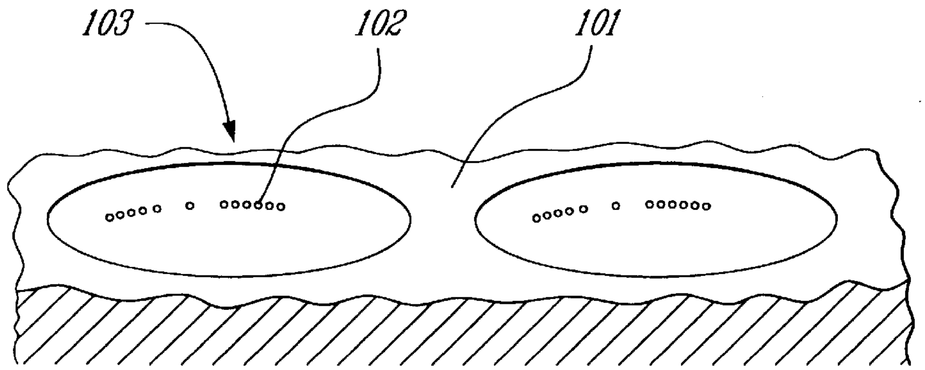
Fig. 11
Fig. 12A
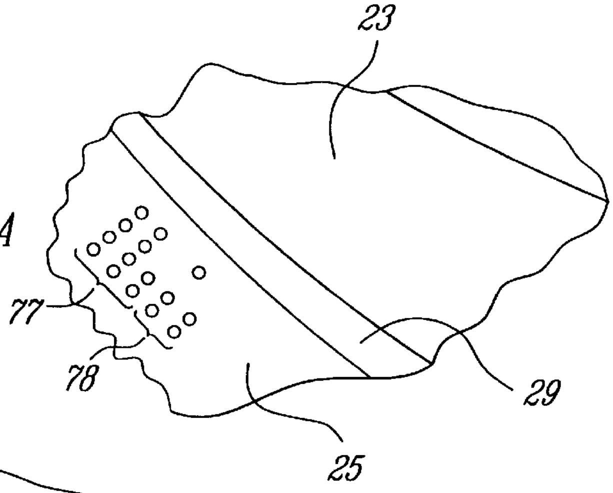
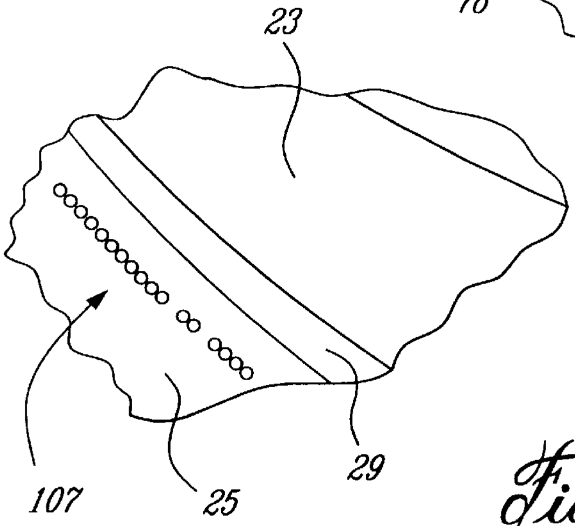
Fig. 12B

METHOD AND STRUCTURE FOR IDENTIFYING SOLID OBJECTS HAVING A DYNAMIC SURFACE

BACKGROUND OF THE INVENTION

1. Field of the Invention

The invention relates to a system for marking a solid object for identification. More specifically it relates to a method and system of marking a solid object with identification which is durable, unique, substantially tamper proof, easy to incorporate into an object to be identified and easy to read when desired. In this specification, dynamic surface means a precision machine contact surface subject to rolling, sliding or pressure contact, such as gear surfaces, piston and cylinder surfaces, gun barrels etc.

2. Description of the State of the Art

Systems for identification of solid objects have been in use for many years and have taken on many forms. Putting serial numbers on objects either on a separate label or as part of the object have been common practice. Often the systems for marking have made the identification markings part of the object during the manufacturing process by making the identification part of the molding process used to form the object. Holes forming patterns on a portion of the object to be identified have also been used together with attempts to attach them, so they are not easily removed or altered.

Most of these identification systems are subject to alteration or tampering, often the serial or identification markings can be removed by grinding, abrading or altered without noticeable indications that such has happened. This inability to indelibly mark an object has been particularly acute with respect to firearms and automobiles. This has added to the burden of the police, since firearms are often the subject of criminal activity or used in the commission of a crime. The existing schemes for identification have a number of deficiencies, in that none are really tamper proof. Also, attempts to make them tamper proof have tended to make the manufacturing process difficult, costly and complex.

Thus, what is needed, is a durable unique and substantially tamper proof system of marking an object for easy identification. Additionally, such a system must not interfere with the manufacturing process, be easy to implement in a cost effective manner and be easily and quickly read when the need to do so arises.

SUMMARY

It is an object of the present invention to provide a durable, secure and substantially tamper proof identification system. In brief, the object of the present invention is achieved by placing on a dynamic surface, such as a precision machine contact surface, markings which do not affect the function or structural integrity of the surface. The markings are placed in a readable pattern. Additionally, the markings are fabricated such that they are tamper proof, in that any attempt to deface, alter or grind away the markings is immediately noticeable and will result in a severe degradation or outright destruction of the function of the object marked for identification.

According to the system of this invention, there is provided a durable, secure and substantially tamper proof identification system of the present invention placed on a dynamic surface of an object to be identified. The markings of the identification system comprise small deep holes so that it does not affect the operation of or the structural integrity of the object so marked. However, any attempts to remove or deface the markings of the identification system can degrade or destroy the function of the object and any attempt to alter or change the markings is readily discoverable.

Additionally, the holes are arranged in a unique code. The holes themselves can have a predetermined shape which can include circle, cross, star, square, triangle, polygon or similar geometrical shape.

In yet another aspect of the system of this invention, the holes are minute, meaning that the holes are very small, needing to be inspected using an optical aid, and do not interfere with the structure or operation of the surface marked for identification, as for example 0.050 inches in diameter to 0.0010 inches in diameter or even much smaller. Additionally, the holes may be 0.010 inches deep or much deeper depending on the thickness of the surface on which the holes are being implanted. The small deep holes being such that they do not interfere with the structure or operation of the device marked for identification. However, attempts to remove the holes by grinding or otherwise requires the removal of a significant portion of the surface that such action seriously degrades the operation of the object or in fact destroys it for all practical purposes.

In yet another aspect of the system of this invention the code created with the markings in the present invention can be formed into a binary code where the holes or the absence of holes represent the binary one or zero. The code of holes and blank areas can be set up in a linear array or some other geometrical shape including a matrix, circle or similar shape. The code can include a check sum as part of the code to prevent tampering. Also, the code can be set up such that the presence or absence of a hole in a particular spot with respect to a reference mark can provide the key for the code.

In yet another aspect of the invention, the indentations or holes of the code are fabricated on the selected surface by electrical discharge machining. This allows for implanting the identification markings on any object made up of an electrically conductive material. Firearms provide one class of items where this system of identification provides unique advantages. Specifically, tremendous advantages can be obtained by placing the markings which make up this invention on the inside of a barrel of the firearm; such as on the trailing edge of a land area. The markings can also be used on other objects which have precision machine contact surfaces such as the inside cylinder wall of an engine block.

According to the invention there is also provided a method for creating a durable, secure and substantially tamper proof identification marking system comprising locating a dynamic surface on an object to be identified; determining on which portions of this surface markings can be placed without affecting the function or structural integrity of the object; placing at least one marking on the surface in a readable pattern, so that removal degrades or destroys operation of the of the object so marked, and alteration is immediately detectable.

In another aspect of the method of this invention, fabricating the markings consists of making indentations on the selected surface which generally consists of small deep holes. Additionally, when fabricating the holes they are arranged into a unique code. The holes themselves can be fabricated with a predetermined shape which can include circle, star, cross, square, triangle, polygon or similar geometrical shape.

In yet another aspect of the method of this invention fabricating the holes includes making the holes minute, as small as 0.0010 inches in diameter or even much smaller and deep, as deep as 0.010 inches or much deeper depending on the thickness of the surface on which the holes are being implanted. Making the holes minute: such as small in diameter but deep assures that they do not interfere with the structure or operation of the device marked for identification. However, attempts to remove the holes by grinding, or otherwise, requires the removal of a significant portion of the surface that such action seriously degrades the operation of the object or in fact destroys it for all practical purposes.

In yet another aspect of the method of this invention it includes forming the holes into a binary code where the holes or their absence represent a binary one or zero. Additionally, the forming of the holes or their absence into a code can include forming it into a linear array or some other geometrical shape including a matrix, circle or similar shape. The code can include forming a check sum as part of the code, when needed, to prevent tampering. Also, the forming of the code can include arranging it such that the presence or absence of a hole in a particular spot with respect to a reference mark can provide the key for the code.

In yet another aspect of the method of this invention, the step of fabricating the indentations or holes of the code on the selected surface includes fabricating them by electrical discharge machining.

The method or this invention includes the further aspect of fabricating the identification markings on a firearm, specifically the step of implanting the markings on the inside of the barrel of the firearm and in particular on the trailing edge of a land area among other positions.

The method of this invention also allows for implanting the markings on other objects which have precision machine contact surfaces such as the inside cylinder wall of an engine block.

BRIEF DESCRIPTION OF DRAWINGS

The invention will be better understood by an examination of the following description, together with the accompanying drawings, in which:

FIG. 11 provides a view of two cylinder chambers of an automobile engine block which have the identification system of the present invention implanted thereon;

FIG. 12A is a portion of the barrel of FIG. 1 which depicts implementation of the coding scheme of FIG. 8; and FIG. 12B is a portion of the barrel of FIG. 1 which depicts implementation of the coding scheme of FIG. 7.

DESCRIPTION OF THE PREFERRED EMBODIMENT

The principle of the present invention consists of placing on a dynamic surface of an object, small markings for identification which do not interfere with the operation or functioning of that object. A dynamic surface being a precision machine contact surface. The markings in the preferred embodiment consists of deep holes of small diameter. The depth of the holes being such that any attempt to remove them by grinding or other tampering with the surface, would not only be very noticeable, but would adversely and noticeably affect or destroy the function for which the object was intended. The diameter of the holes and their distribution is such that their presence does not interfere with the normal functioning of the object nor do they adversely affect the strength or structure of the object marked for identification. The distribution of the holes is such that they form a code which can uniquely identify the object so marked. The preferred embodiment provides a number of means to position the holes to form a code, one being the formation of a binary code by the presence or absence of a hole in a particular spot or positioning each of the holes in one of two alternative spots. An additional practice, of the preferred embodiment of the present invention, provides for markings to be of such a small size and located in at least a partially concealed position that one cannot easily tamper with them or read them with the unaided eye but they are still easy to read with existing standard devices.

One such object on which this invention can be used is a gun, specifically the inside of the barrel of a gun, which provides the dynamic surface on which the marking system of the present invention can be used. The interior surface of a gun is also a dynamic surface since it has an object, a slug, passing across its surface when used. The interior surface of a barrel of a gun has been manufactured to precise and exacting standards so it can accommodate a fired slug as it moves down the barrel. Any attempt to file, grind down or in some other way tamper with a portion of the interior of a gun barrel would be very noticeable and could easily effect and destroy the function of the gun or at least make it unsafe to use.

Figure 1:
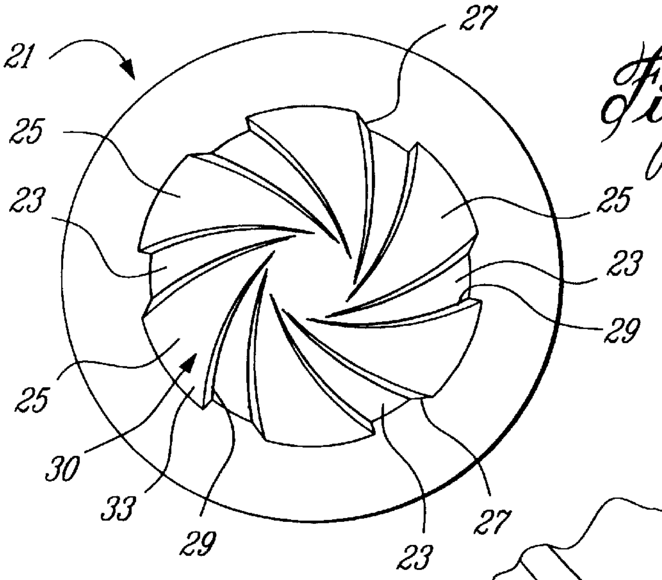
FIG. 1 is a front view of a gun barrel which employs the identification system.

FIG. 1 depicts the interior surface of the front end of a barrel of a gun. The rifling can be seen in the barrel consisting of the grooves 25, land areas 23, the leading edges of the land areas 27 and the trailing edges of the land areas 29. The marking system 30 of the present invention appears in the preferred position in the groove 25 adjacent to the trailing edge 29 of the land area 23 of the interior surface of the barrel. The marking system 30 consists of a pattern of holes 33. Although they have been made visible in FIG. 1 in actual practice, because of their position and size they cannot generally be seen with the unaided eye.

The preferred embodiment when the system is used in a gun, calls for positioning the marking system adjacent to the trailing edge of the land area 29, since this area of the barrel of a gun experiences the least force of the slug moving down the barrel of the gun. As one faces the barrel in FIG. 1 a fired slug moving towards the end of barrel 21 would rotate in a counter clockwise direction. This is due to the fact that the leading edge 27 of the land area 23 would force the slug to rotate in this direction, the direction of the twist of the land areas in the barrel. Thus the force of the slug moving down the barrel would be primarily on leading edge 27. Consequently, trailing edge 29 experiences the least amount of the force of the moving slug. The identification 30 could be place on other parts of the barrel but they would be more subject to wear.

Figure 2:
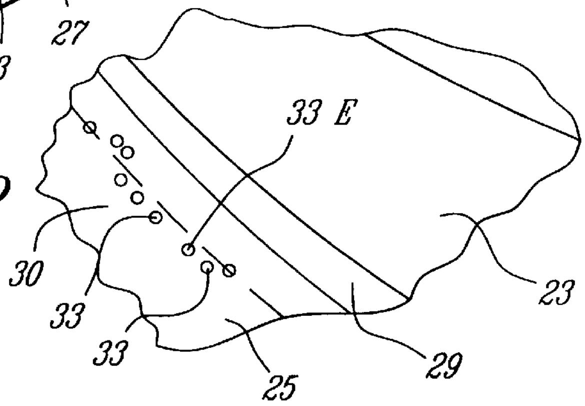
FIG. 2 is a portion of the barrel of FIG. 1 which shows a closer view of the system of identification of the present invention.

FIG. 2 provides a magnified view of a portion the trailing edge 29 of the land area 23 and the adjacent portion of the groove 25. The identification system 30 of the present invention formed by blind holes 33 and blank spots 33E appears on the groove 25 adjacent to the trailing edge 29 of land area 23. This is the preferred location for the reasons stated above. In the preferred embodiment in which the markings are placed inside a firearm barrel, the markings are preferably placed at the chamber end of the barrel instead of the muzzle end. This prevents the removal of the markings by sawing off the muzzle end of the firearm. The use of the EDM method is a practical way to create the holes using an instrument that can be deeply inserted into the firearm barrel. The inspection of the holes can then by made either from the muzzle end or from the breech end.

Figure 6A:
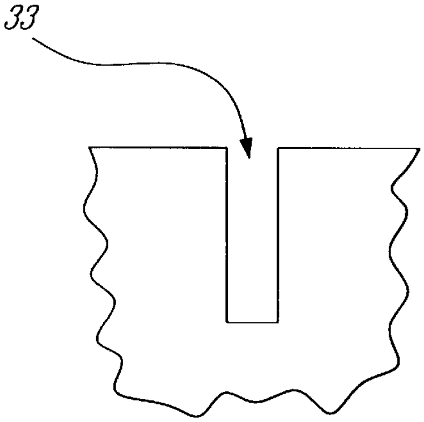
FIG. 6A is a cross sectional view of a hole bored in the object marked for identification.
Figure 6B:
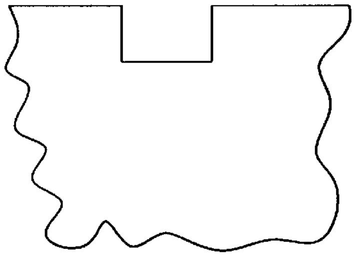
FIG. 6B is a cross sectional view of another alternate version of a hole bored in the object marked for identification.
Figure 10:
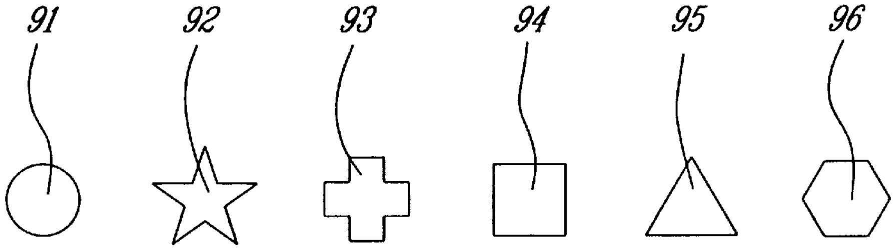
FIG. 10 depicts various shapes the holes which make up the identification system of the present invention can take.

FIGS. 6A and 6B provide cross sectional views of two different configurations of the holes 33. In the preferred embodiment as depicted in FIG. 6B the holes can be 0.010 inches in diameter and 0.010 inches in depth. The diameter of the holes could be substantially increased or decreased and the invention still practiced . However, substantially deeper holes 33 as depicted in FIG. 6A could be made which do not effect the operation or structure of the gun but would make it even harder for someone to tamper with the holes. FIG. 6A provides just such a cross sectional view of a hole which is both deeper and smaller in diameter. Additionally, the holes do not have to be perfectly round but can assume other shapes, as depicted in FIG. 10, and still perform the identification function and in fact add more choices to the types of identification available. Thus in referring to holes in general, in this specification and as will be discussed in detail below the broader definition of hole should be followed.

Regarding the size of the holes, several criteria must be met, the holes must not be so large that they will interfere with or degrade the operation of the object marked nor should they affect the structural integrity of the item marked for identification. Also they must be deep enough so that they cannot be removed or altered by grinding or abrading. The suggested diameter of about 0.010 inches or small does not affect the operation or structure of the object marked. The depth of 0.010 inches has been determined to be adequate to prevent tampering or alteration by grinding or abrading. However, much deeper holes can be fabricated by the manufacturing process used if the much deeper holes do not affect structure or operation of the object identified. Of course, blind holes could be filled, preferably using a transparent or optically distinct filler, the purpose of filling the holes being to prevent dirt and other contaminants from filling the holes, as well as to maintain a smooth dynamic surface.

FIGS. 5, 7, 8 and 9 depict four different implementations of potential coding arrays. Although the preferred embodiments use a binary based coding system, because of the utility it offers, it is possible to use coding systems with a different bases.

Figure 5:
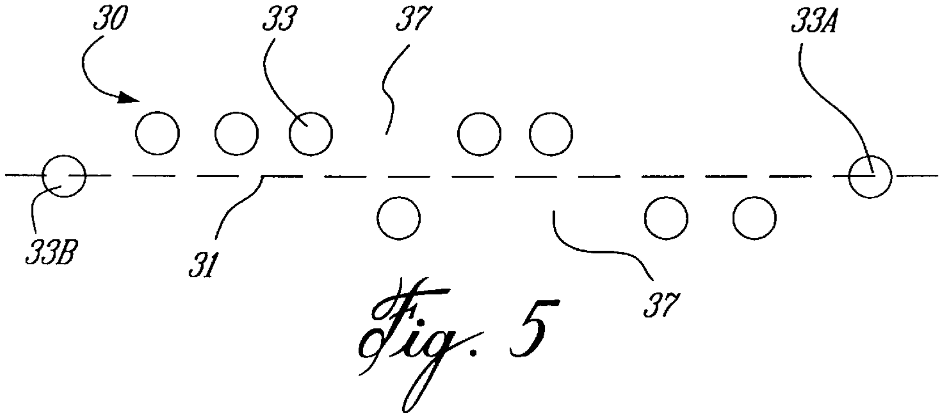
FIG. 5 is a view of a preferred coding scheme for the present invention.

FIG. 5 depicts an eight digit binary number. Holes 33A and 33B are not part of the number but merely used to show the beginning and end of the number. In FIG. 5 the binary code is implemented by positioning a hole 33 in one of two alternative positions such as above or below reference line 31. In the case of FIG. 5, the convention could be followed that holes above the reference line 35 represent the binary 1 and those below the reference line 35 represent the binary 0. The reference line has only been included for illustrative purposes and would not be etched on the groove of the gun. In the preferred embodiment as depicted in FIG. 2, the coding would run parallel to the trailing edge 29 of land area 23. However, they could be positioned in many other ways, although the most practical and efficient way, is to run them parallel to the land areas. Given the fact that the system in FIG. 5 calls for a hole above or below the line, its configuration is tamper proof. Any attempt to add a hole would result in a hole on both sides of reference line 35, an anomaly, and be immediately noticeable. The eight bit binary number depicted in FIG. 5 only provides 256 different combinations. Thus obviously a larger number would have to be used if more than 256 items need to be marked. Schemes which can accommodate substantially larger numbers of items will be discussed below.

Figure 7:
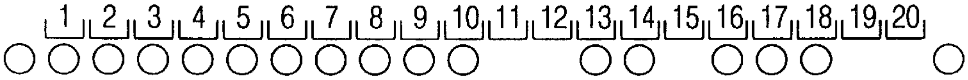
FIG. 7 depicts an alternate version of a coding scheme for the present invention.

FIG. 7 presents a linear array where the convention followed makes the holes 33 represent the 0 of the binary system and the blank spaces 33D represent the 1 of the binary system. Obviously, the opposite convention could be followed such as the holes represent the binary one and the blank spaces the binary zero without affecting the result. The first hole 33C and last hole 33E would merely be place holders to designate the beginning and end of the number. FIG. 7 shows a twenty digit binary number, the numbers 1 to 20 set above each position are merely there for illustrative purposes. In FIG. 7 the bits at positions 1 to 16 make up the binary serial number of the object marked for identification with position 16 being the least significant bit and position 1 being the most significant bit. Given the fact that the binary number represented by digits 1 to 16 has sixteen digits this allows for a total of 65,536 potential combinations. A substantial increase from the example provided in FIG. 5. The bits at positions 17 to 20 make up a check sum and thus act as a guard against tampering with the binary numbers. Such tampering could consist of adding holes to blank spaces. The check sum has four digits and would provide a confirming count of the sum binary ones at positions 1 to 16 stripped of their significant position. As is well known, a four digit binary number has sixteen possible combinations and since the binary number at positions 1 to 16 can have a total of no more than 16 binary ones, the four digit check sum, is of sufficient size to cover all of the possibilities. In the example provided in FIG. 7 the binary number depicted is 32 in the decimal number system. Thus, the binary check sum at positions 17 to 20 corresponds to three in the decimal system the number of binary ones or blank spaces in the binary number at positions 1 to 16. Alternatively, the check sum could provide a tally of the number of the binary zeros instead of the binary ones without affecting the result or purpose. Also, those skilled in the art will readily note that the coding system described herein can be further enhanced by encrypting both the sixteen digit binary serial number and four digit binary check sum. Such systems are well know in the art.

The 20 bit binary number described above could just as easily be implemented with the scheme depicted in FIG. 5 without any problem and achieve the same result. Also, the preferred embodiment provides a number of other alternatives to the two linear arrays depicted in FIGS. 5 and 7. These alternatives will now be reviewed.

Figure 8:
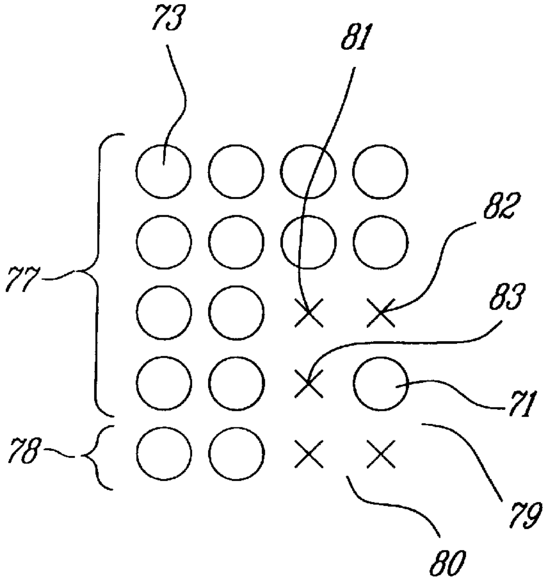
FIG. 8 depicts an alternate way for configuring the coding system of the present invention.

FIG. 8 depicts an array set up as a matrix, which would be very easy to use instead of a linear array. For the purposes of description we again use the convention that a hole represents a zero and a blank space represents a one. Since we are using a matrix with a known number of rows and columns we do not need place holders to designate where the coding starts and ends. Using the same example as in FIG. 7, in FIG. 8 we have the binary serial number the sixteen digit binary number in the top four rows 77, with the most significant digit at position 73 and the least significant digit at position 71. We will follow the convention that the significance of the digit increases in the rows running from right to left as you ascend up the rows. The check sum is in the bottom row 78 with the least significant digit at 79. Thus since there are two blank positions 80 and 79 in check sum 78, based on their position the number corresponds to a decimal based 3. The serial number 77 thus has three binary ones at positions 81, 82 and 83 and the binary number at 77 corresponds to the decimal number 32. Naturally, various encryption methods could be used to further enhance the system and thwart tampering.

Figure 9:
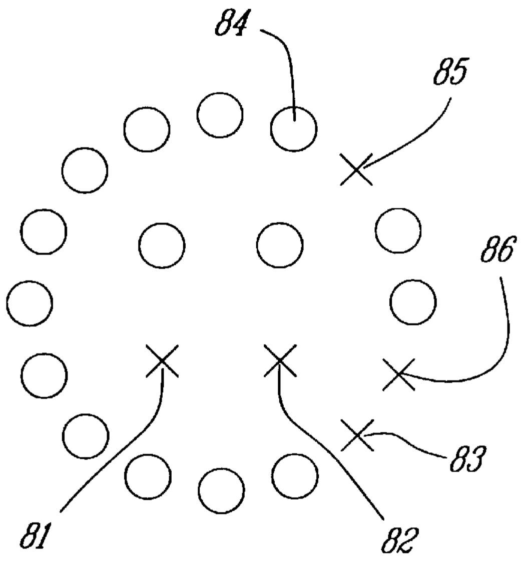
FIG. 9 depicts yet another way to configure the coding system of the present invention.

FIG. 9 represents another alternative array, which uses the same binary examples as that used in FIGS. 7 and 8. The sixteen digit binary serial number is arranged in a circle with the least significant digit at 84 and the significance of the digits increasing as you move clockwise around the circle. The check sum is at the center of the circle with binary ones at positions 81 and 82. Thus the binary check sum again corresponds to the decimal systems three. This again forms the check for the three binary ones 83, 85 and 86 in the sixteen binary number which again corresponds to 32 in the decimal system.

FIG. 12A depicts implementation on the preferred dynamic surface 25 of the coding scheme shown in FIG. 8 and discussed above. FIG. 12B depicts implementation on the preferred dynamic surface 25 of the coding scheme shown in FIG. 7 and discussed above.

These are only illustrative examples of how a coding system could be implemented using the concepts of the present invention. Much larger binary numbers could be etched on the interior of the barrel. For example a binary number with 32 digits would provide an incredible number of combinations which would dwarf the 65,536 combinations a sixteen bit number provides In fact, as well know in the art, a 32 bit number would provide 4,294,967,296 possible combinations. On the other hand a 32 bit number would only require a five bit binary check number. Also given the minute size at which the holes can be fabricated, as discussed elsewhere herein, a linear array of 50 holes would be no more than an inch long. Thus, the system offers potentially unlimited possibilities even if you use schemes which use significantly fewer holes than 50. Additionally, in the preferred embodiment, coding could be placed along the trailing edge of more than one land area or at other positions in the same barrel. Also, it would be possible to use other non-binary coding schemes and still practice the invention. Thus the possible coding schemes and available unique numbers could approach an infinite number.

In the preferred embodiment, electrical discharge machining (EDM) would provide the method of making the markings or holes. EDM provides a metal removal process accomplished by the creation of thousands of electrical discharges per second that flow between an electrode and the object being machined while that object is immersed in a dielectric fluid. The EDM process can be used on any electrically conductive material.

The EDM process, in principle, has been known since the early 1940's and used as a manufacturing process since the early 1950's. Two major EDM manufacturing processes exist. One known as sinker EDM, which sinks the shape that is on the electrode partway into the object being machined. Wire EDM, the other form, uses a wire electrode. The wire burns a predetermined contour through the object being machined leaving a path of 0.001 inches to 0.003 inches larger than the wire diameter. The wire diameter ranges from 0.0005 inches to 0.0130 inches. Brass is the most common wire used along with zinc-coated wire. Smaller wires are generally made of molybdenum or tungsten. Thus, it can be readily seen, that precise holes of 0.010 inches in diameter or much smaller diameter can be fabricated in the dynamic surface of the object to be identified. Thus it can be seen the holes can be made minute. By minute we mean they can be made in diameter anywhere from 0.050 inches down to 0.0010 inches or smaller. The depth to which holes can be fabricated can be as shallow as 0.010 or much deeper depending on the thickness of the surface in which they are made. The depth is also chosen such that removal of the markings by grinding the surface down to the bottom of the holes would destroy or noticeably impair the operation of the dynamic surface.

Additionally, holes with varying shapes are possible. FIG. 10 depicts a number of the potential shapes the holes can be fabricated in, depending on the shape of the electrode used. Potential shapes consist of a circle 91, star 91, cross 93, square 94, triangle 95 or hexagon 96. In fact, the holes could be fabricated in the shape of any other number of geometrical shapes.

Figure 3:
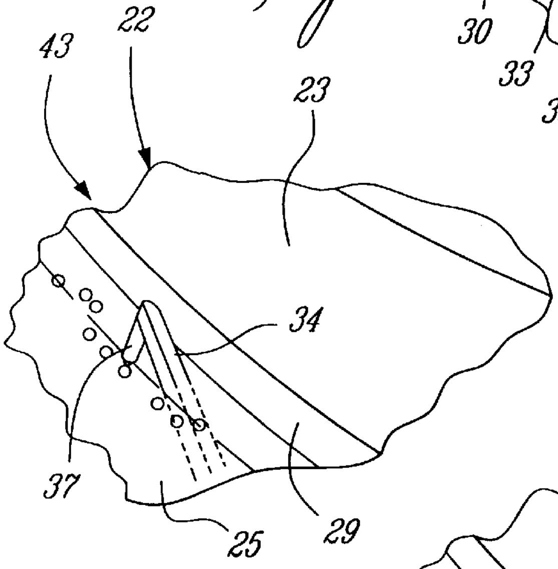
FIG. 3 is a portion of the barrel of FIG. 1 which depicts a portion of the process used to make the markings of the present invention.

FIG. 3 provides a partial view of the EDM process being used to make the markings of the present invention. In FIG. 3 an EDM probe 34 has electrode 37 at its end. Those skilled in the art know that the probe 34 together with attached electrode can be made small enough to fit into the end of a gun barrel and then precisely aligned to make the appropriate holes to the necessary depths at the desired location. Normally, both would be immersed in the appropriate dielectric fluid 43.

Two of the additional features of this invention are the placing of the markings on surfaces which are not readily accessible and making the markings of a small size so they can not easily be seen. As noted above EDM technology allows the markings to be easily added in a minutely small size to normally difficult to reach surfaces. Also with EDM, the markings can be added after the manufacture and assembly of the object to be identified. Additionally, as will be noted below, although the markings or holes are in a difficult to reach spot to alter or change, they can be easily read and interpreted by readily available cost effective means. Thus, placing the markings on the interior surface of the barrel of the gun demonstrates all of the aspects of this invention.

Figure 4:
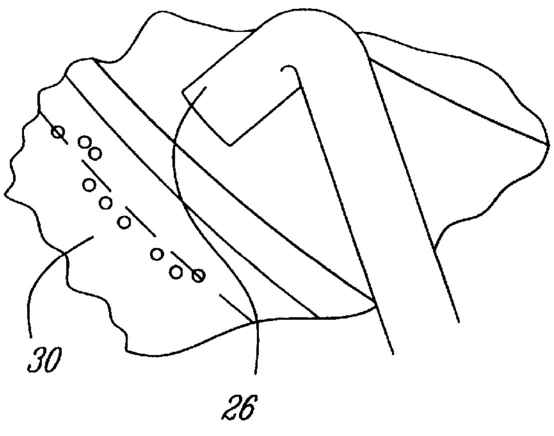
FIG. 4 is a portion of the barrel of FIG. 1 which depicts a portion of a system which can be used to read the system of identification of the present invention.

FIG. 4 depicts a fiber optic device 36 designed to read the makings 30 on the interior surface 22 of the gun barrel 21. Any number of adaptable devices, well know in the art, can be used to read the markings placed on the interior surface of the gun barrel 21 as described by this invention. A borescope, a device well known in the art, could be equipped with a probe that can be inserted inside the barrel of a gun. A fiber-optic connection could provide illumination and means for capturing images inside of the barrel. Such a device could be connected to an electronic camera that could store images in computer memory where appropriate software could interpret the numerical identification code. Alternatively, or as a parallel system, the image captured by the fiber-optic probe could be displayed on a computer screen and read and interpreted directly by the operator of the probe.

Although the specific example used in implementing the above invention involves a gun, it can easily be seen that any type of object with a dynamic surface could be a candidate for the identification system disclosed herein. An automobile would provide another ideal candidate for the identification system of this invention. It has many dynamic surfaces. Given the frequency with which automobiles are stolen the system of the present invention would certainly provide a needed identification system to help stem this problem. One such ideal surface is the interior surface of the cylinder chamber 103 of the engine block 101 as depicted in FIG. 11. In FIG. 11, the holes 102 appear along the wall 103 of the cylinder. Naturally, any one of the coding schemes described above could be used on automobiles.

Finally, while the present invention has been described as ideal for use on dynamic surfaces, as defined herein, it also can be used on non-dynamic surfaces with a similar result in many cases. Although a surface may not be dynamic it still may be a precision surface manufactured to certain tolerances. Thus, any attempt to tamper with these surfaces would be readily detectable and in fact diminish the quality and functionality of the surface. Such actions might not only mar the surface and thus diminish the value, it could also degrade or even destroy its function.

While the invention has been particularly shown and described with reference to a preferred embodiment thereof, it will be understood by those skilled in the art that various changes in form and detail may be made to it without departing from the spirit and scope of the invention.

What is claimed is:

1. A durable, secure and substantially tamper proof identification structure comprising: at least one marking placed on a dynamic surface of an object to be identified, said at least one marking being at least one hole so that it does not affect the operation of or the structural integrity of the object so marked, but any attempt to remove or deface the at least one marking can degrade or destroy the function of the object and any attempt to alter or change the at least one marking is detectable.

2. The structure of claim 1 wherein the at least one hole has a predetermined shape.

3. The structure of claim 2 wherein the at least one hole is minute.

4. The structure of claim 3 wherein the at least one hole is a plurality of holes arranged in a pattern which provides a code.

5. The structure of claim 4 wherein the plurality of holes forming the code are in a linear array.

6. The structure of claim 4 wherein the plurality of holes forming the code are in a nonlinear array.

7. The structure of claim 6 wherein the nonlinear array is in the shape of a matrix.

8. The structure of claim 4 wherein the code is a binary code.

9. The structure of claim 8 wherein the binary code is defined by each hole being placed in one of two alternative positions.

10. The structure of claim 8 wherein the binary code is defined by either the presence or absence of a hole.

11. The structure of claim 10 wherein the binary code includes a check sum.

12. The structure of claim 8 wherein the binary code is arranged in a linear array.

13. The structure of claim 8 wherein the binary array is formed in a non linear array.

14. The structure of claim 13 wherein the non linear array is in the shape of a matrix.

15. The structure of claim 4 wherein each of the holes making up the plurality of holes have a diameter of 0.050 inches to 0.010 or less and a depth of 0.01 to 0.10 inches or more.

16. The structure of claim 3 wherein the at least one hole is about 0.010 inches in diameter or less and 0.010 inches in depth or more.

17. The structure of claim 1 wherein the at least one hole is made on the dynamic surface by electrical discharge machining.

18. The structure of claim 17 wherein a probe with an electrode evacuates a portion of the dynamic surface to create the marking.

19. The structure of claim 4 wherein the plurality of holes are located in a partially concealed position of said object whereby they are difficult to access for purposes of altering.

20. The structure of claim 19 wherein the plurality of holes can be read by a fiber optic device.

21. The structure of claim 19 wherein the inaccessible position is on the inside of the barrel of a gun.

22. The structure of claim 21 wherein the plurality of holes can be read by a combination borescope fiber-optic device.

23. The structure of claim 21 wherein the location of the plurality of holes is in a groove adjacent the trailing edge of a land area in the barrel close to a chamber of said gun.

24. The structure of claim 4 wherein the at least one hole is located on the appropriate surface of an automobile for identification purposes.

25. The structure of claim 24 wherein the appropriate surface is on the engine block of the automobile.

26. The structure of claim 25 wherein the appropriate surface on the engine block is on the inside of the cylinder wall.

27. The structure of claim 2 wherein the hole has a geometrical shape.

28. The structure of claim 20 wherein the geometric shape is selected from one of the following shapes: circle, cross, star, square or polygon.

29. A method for creating a durable, secure and substantially tamper proof identification marking comprising:

locating a dynamic surface on an object to be identified;

determining on which portions of this surface markings can be placed without affecting the function or structural integrity of the object;

placing at least one marking on the surface in a readable pattern by forming at least one hole in the surface;

so that any attempt to remove the marking will degrade or destroy the function of the object, and any attempt to alter it is easily detectable.

30. The method of claim 29 wherein the step of forming the at least one hole comprises forming it in a unique shape.

31. The system of claim 30 wherein the step of forming the unique shape comprises forming it into a geometrical shape.

32. The system of claim 31 wherein the step of forming into a geometrical shape comprises forming it into a shape selected form one of the following shapes: circle, cross, star, square or polygon.

33. The method of claim 29 wherein the step of forming the hole comprises forming a minute hole.

34. The method of claim 33 wherein the step of forming the at least one hole comprises forming a hole of about 0.010 inches or less in diameter and about 0.010 inches or more in depth.

35. The method of claim 29 wherein the step of forming the at least one hole comprises forming the hole with electrical discharge machining.

36. The method of claim 33 wherein the step of forming a minute hole comprises forming it in a location inaccessible to the unaided eye.

37. The method of claim 36 wherein the step forming the at least one hole comprises forming it on the inside of a barrel of a gun.

38. The method of claim 37 wherein the step of forming the at least one hole on the inside of a barrel of a gun further comprises forming it on a groove adjacent to a trailing edge of a land area in the barrel near a chamber end of said gun.

39. The method of claim 29 wherein the step of forming the at least one hole comprises the step of forming a plurality of holes into a unique code.

40. The method of claim 39 wherein the step of forming the plurality of holes into a unique code comprises forming them into a binary code.

41. The method of claim 40 wherein the step of forming a binary code comprises placing each hole in one of two alternative positions.

42. The method of claim 40 wherein the step of forming a binary code comprises the step of defining the code by a presence or absence of the holes in particular position.

43. The method of claim 40 wherein the step of forming the binary code includes the step of forming a check sum.

44. The method of claim 40 wherein the step of forming the binary code includes forming it in a linear array.

45. The method of claim 40 wherein the step of forming the binary code includes forming it in a nonlinear array.

46. The method of claim 45 wherein the step of forming the binary code includes forming it in a nonlinear array comprises: forming it into a matrix.

47. The method of claim 39 wherein the step of forming the code includes the step of forming a check sum.

48. The method of claim 39 wherein the step of forming the code includes forming it in a linear array.

49. The method of claim 39 wherein the step of forming the code includes forming it in a nonlinear array.

50. The method of claim 46 wherein the step of forming the binary code includes forming it in a nonlinear array comprises: forming it into a matrix.

51. The method of claim 29 wherein comprising the further step of reading the code by means of a fiber-optic probe.

52. A durable, secure and substantially tamper proof identification structure comprising: a plurality of minute holes placed on a surface of an object to be identified, with said holes arranged in a pattern which provides a code, said holes being such that they do not affect the operation of or the structural integrity of the object so marked, but any attempts to remove or deface the holes can mar the surface or degrade or destroy the function of the object and any attempt to alter or change the holes is detectable.

53. The structure of claim 52 wherein the code is a binary code.

54. The structure of claim 52 wherein the plurality of holes are made on the surface by electrical discharge machining.

55. The structure of claim 52 wherein the plurality of holes are located in a partially concealed position on said object whereby they are difficult to access for purposes of altering.

56. The structure of claim 55 wherein the plurality of holes can be read by a fiber optic device.

57. The structure of claim 52 wherein the holes have a geometrical shape.

58. The structure of claim 57 wherein the geometric shape of the holes is selected from one of the following shapes: circle, cross, star, square or polygon.

59. A method for creating a durable, secure and substantially tamper proof identification marking comprising:

locating a surface on an object to be identified;

determining on which portions of this surface markings can be placed without affecting the function or structural integrity of the object;

placing a plurality of minute holes on the surface in a readable pattern;

so that any attempt to remove the marking will mar the surface or degrade or destroy the function of the object, and any attempt to alter it is easily detectable.

60. The system of claim 59 wherein the step of forming the holes comprises forming them in a geometrical shape.

61. The system of claim 60 wherein the step of forming into a geometrical shape comprises forming them into a shape selected form one of the following shapes: circle, cross, star, square or polygon.

62. The method of claim 39 wherein the step of placing the holes in a readable pattern comprises forming them into a binary code.

63. The method of claim 59 wherein the step of forming the holes comprises forming the holes with electrical discharge machining.

64. The method of claim 59 wherein the step of forming the hole comprises forming them in a location on the surface inaccessible to the unaided eye.

65. The method of 64 comprising the further step of accessing and reading the holes with a fiber optic device.

* * * * *